Dec. 23, 1958 C. A. HENNESSY 2,865,578
CARRIER ROUTING DEVICES FOR PNEUMATIC CONVEYOR SYSTEMS
Filed Nov. 23, 1955 7 Sheets-Sheet 1
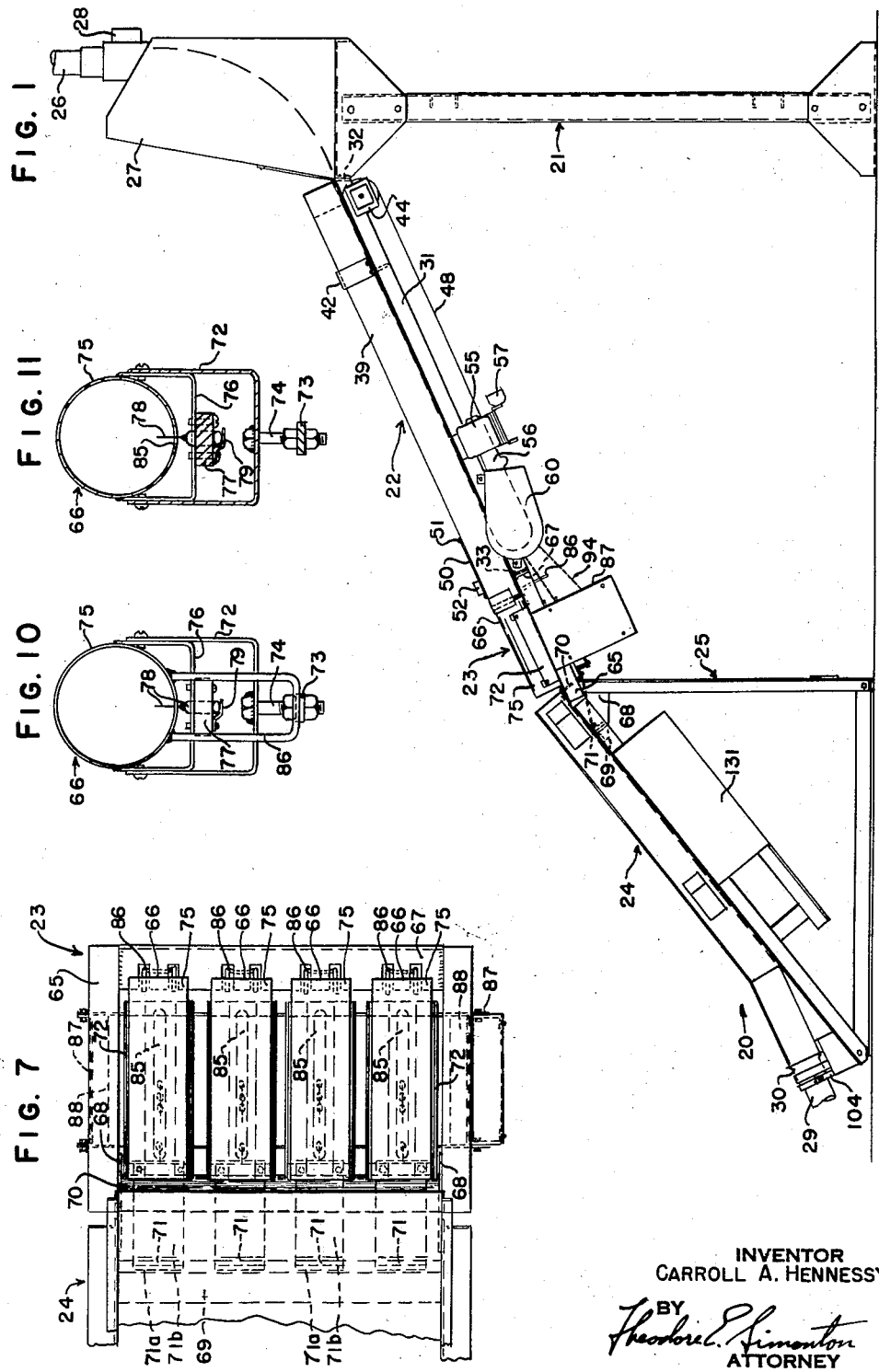
INVENTOR
CARROLL A. HENNESSY
BY
ATTORNEY Dec. 23, 1958     C. A. HENNESSY     2,865,578
CARRIER ROUTING DEVICES FOR PNEUMATIC CONVEYOR SYSTEMS
Filed Nov. 23, 1955     7 Sheets-Sheet 2
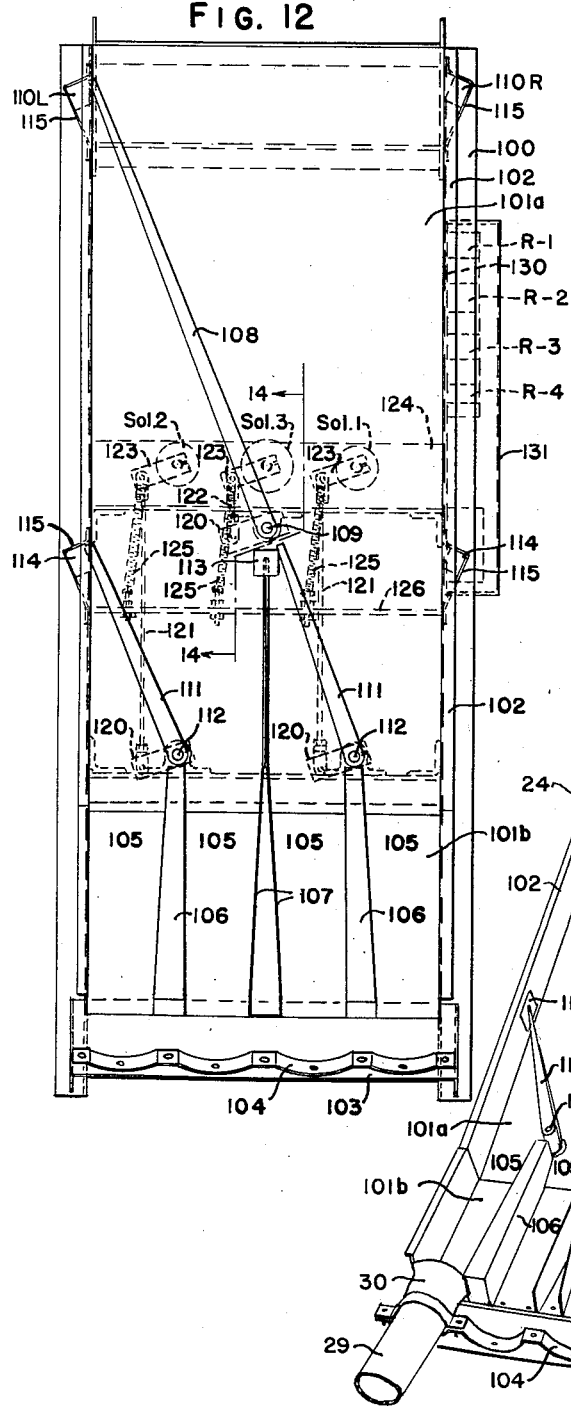
INVENTOR
CARROLL A. HENNESSY
BY
*Theodore E. Simonton*
ATTORNEY

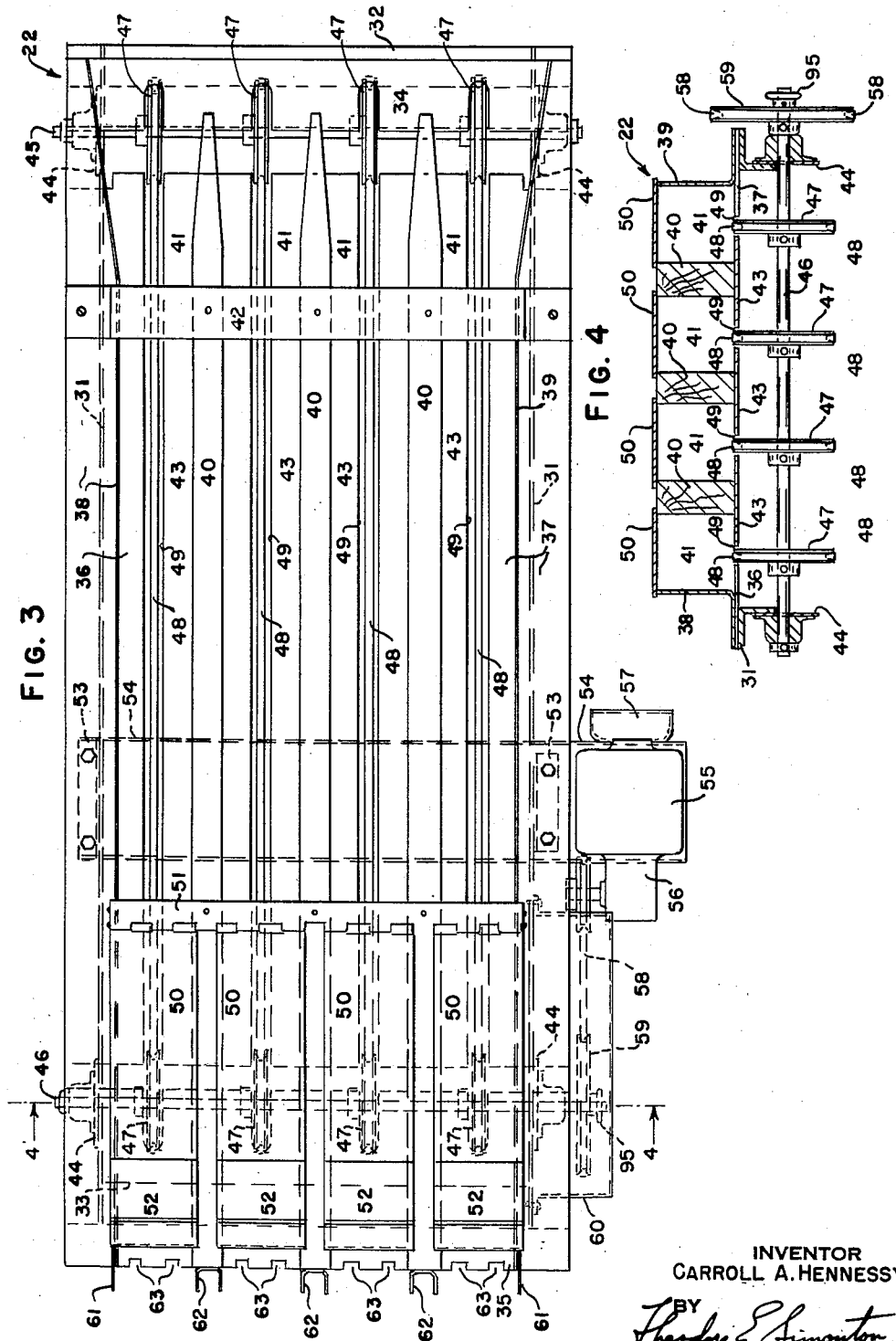

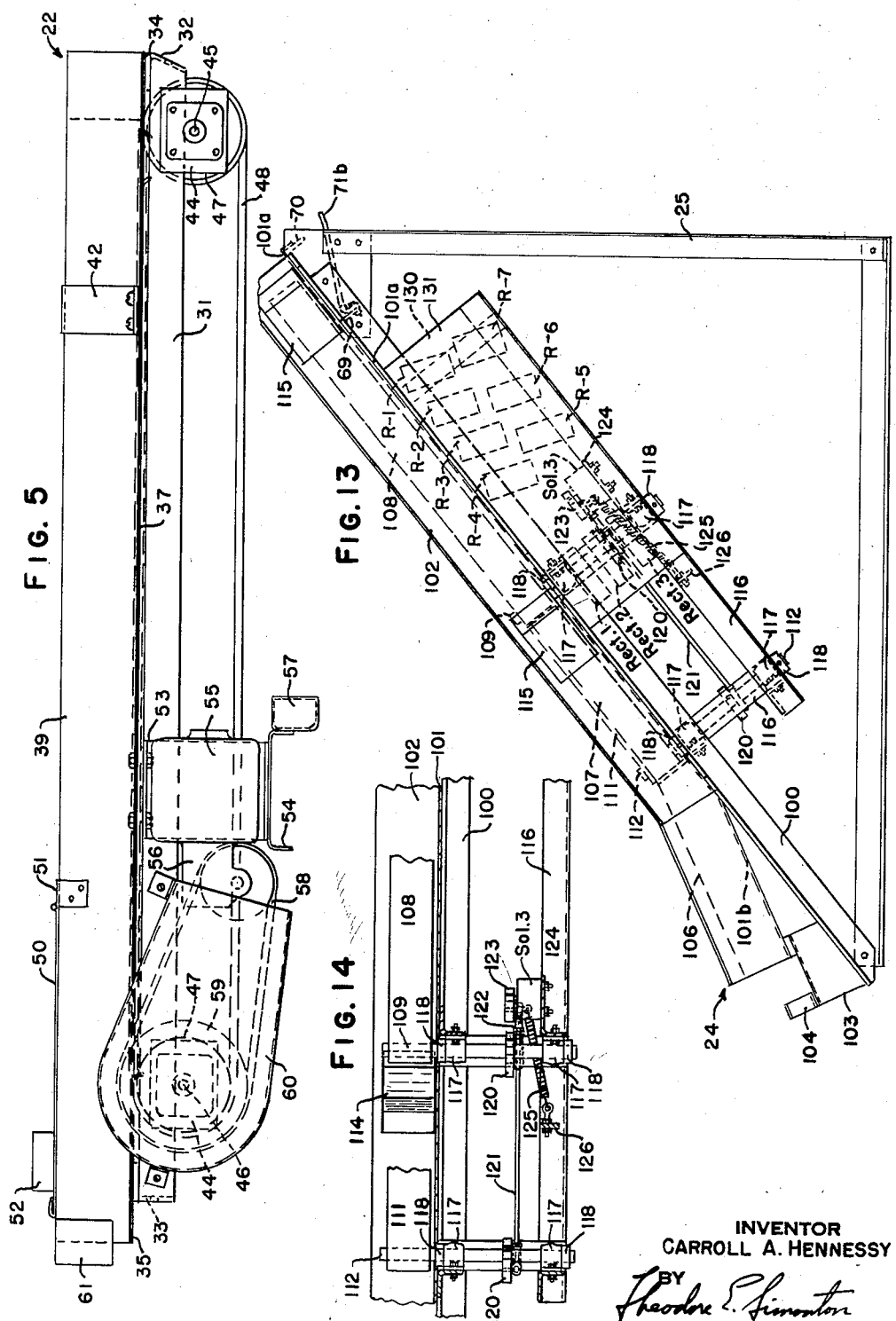

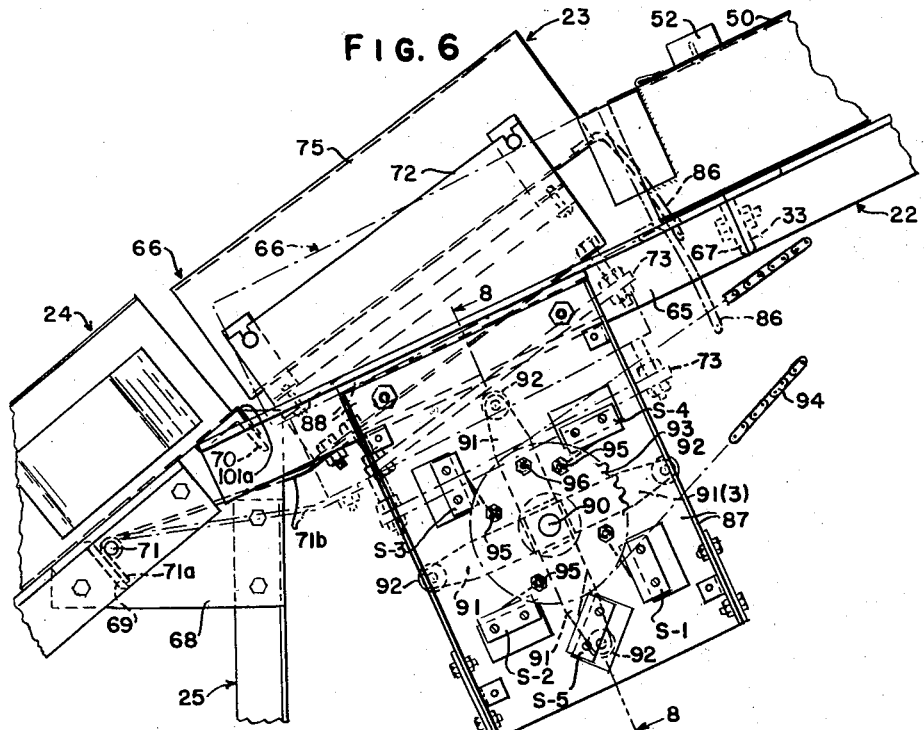
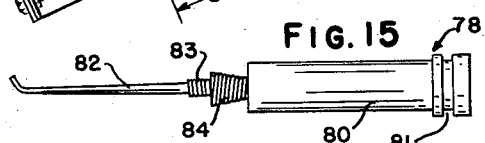
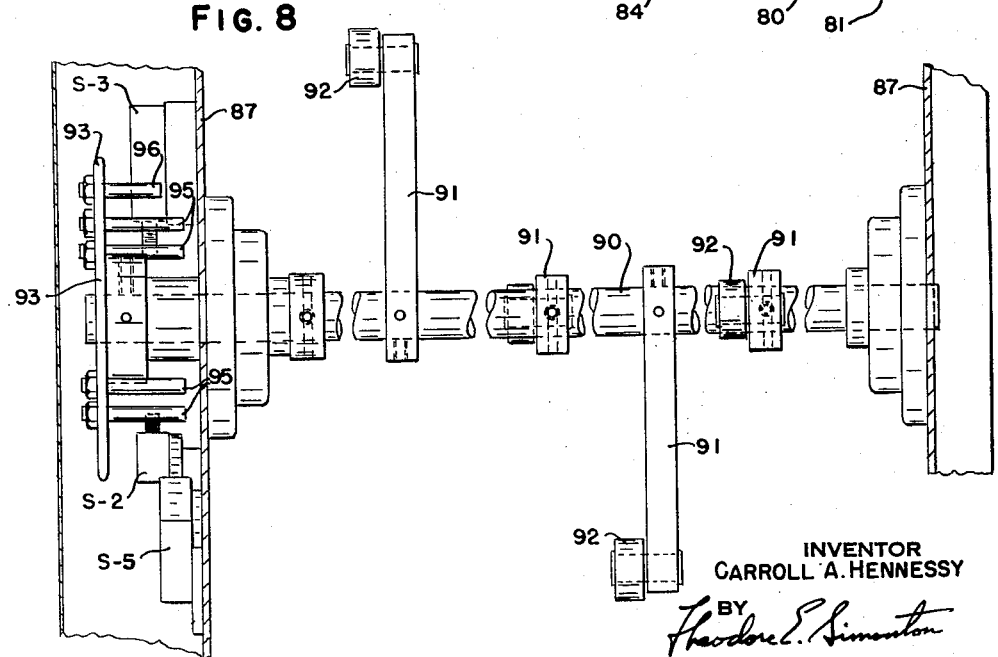

Dec. 23, 1958   C. A. HENNESSY   2,865,578
CARRIER ROUTING DEVICES FOR PNEUMATIC CONVEYOR SYSTEMS
Filed Nov. 23, 1955   7 Sheets-Sheet 6

INVENTOR
CARROLL A. HENNESSY
BY
ATTORNEY

Dec. 23, 1958  C. A. HENNESSY  2,865,578
CARRIER ROUTING DEVICES FOR PNEUMATIC CONVEYOR SYSTEMS
Filed Nov. 23, 1955  7 Sheets-Sheet 7
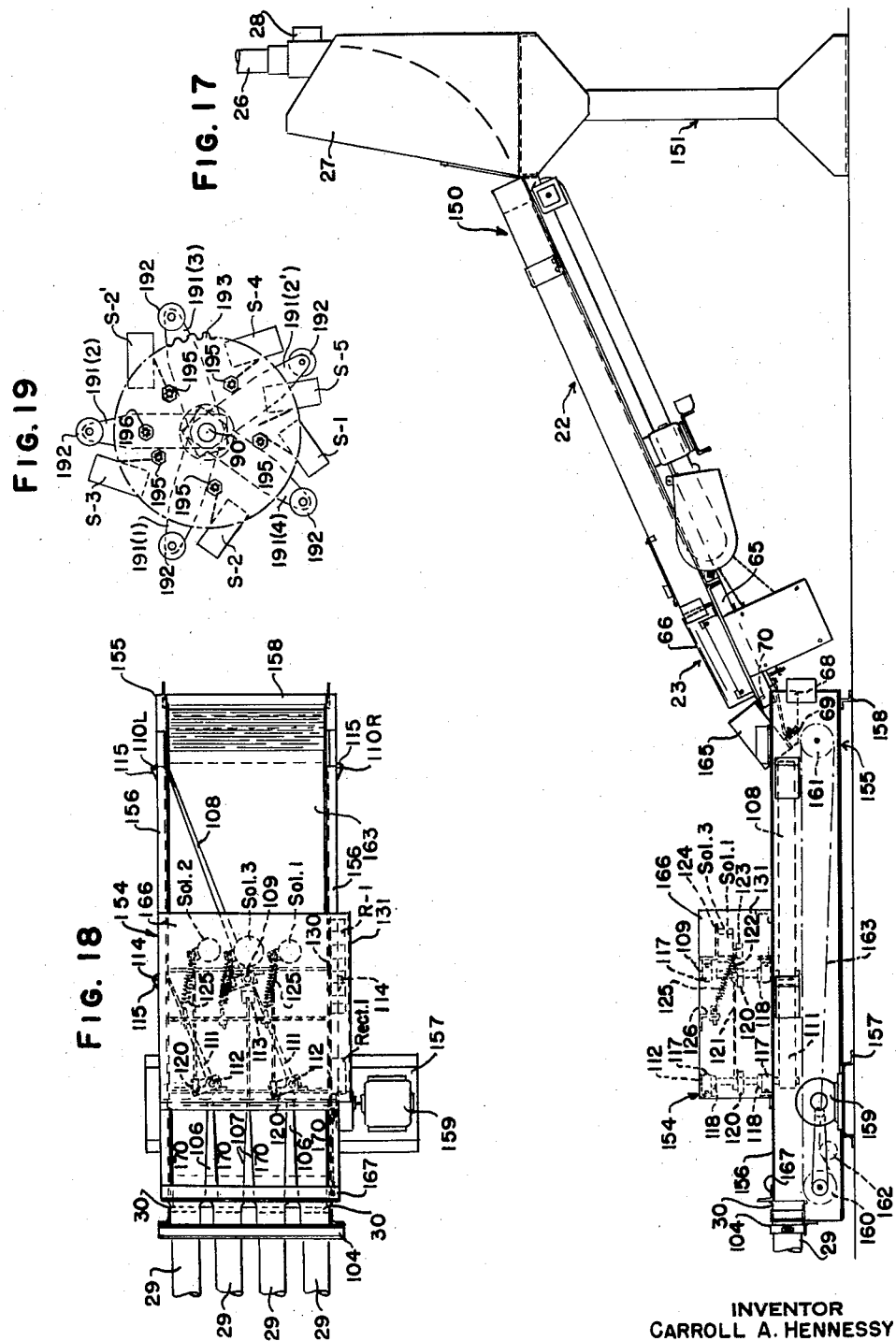
INVENTOR
CARROLL A. HENNESSY
ATTORNEY United States Patent Office 2,865,578
Patented Dec. 23, 1958

2,865,578

CARRIER ROUTING DEVICES FOR PNEUMATIC CONVEYOR SYSTEMS

Carroll A. Hennessy, Syracuse, N. Y., assignor to Lamson Corporation, Syracuse, N. Y., a corporation of New York Application November 23, 1955, Serial No. 548,641

8 Claims. (Cl. 243—16)

This invention relates to an automatic routing device for pneumatic conveyor systems and more particularly to a carrier spacing device therefor.

In pneumatic conveyor systems, it is desirable that a carrier may be sent from any one of several different dispatch stations to any selected one of several different terminal stations. In order that the carrier may be routed automatically without manual redispatch of the carrier at an intermediate station, the carrier is provided with spaced electrical signal contacts adapted to be contacted by a sensing device placed along the route of the carrier for operating a deflector to route the carrier to its selected destination. When a plurality of dispatch stations are joined to a plurality of terminal stations, through an intermediate central routing station, means must be provided at the routing station for spacing the carriers one from another so that they may arrive separately at the sensing means for rerouting.

The principal object of the present invention is to provide a routing device for pneumatic conveyor systems in which the carriers arriving at the device may be separated for successive contact with the sensing device for proper routing.

A further object of the invention is to provide spacing means for carriers in such a routing device which will insure routing of the carriers from each of the lines in turn and which will enable the carriers to be routed successively with the minimum of delay.

A still further object of the invention is to provide spacing means for carriers in such a routing device having storage space for carriers dispatched in said system and awaiting the action of said device.

Other objects and advantages of the present invention will be apparent from the following description taken in conjunction with the accompanying drawings, in which:

Figure 1 is a side elevational view of a routing device according to the invention;

Figure 2 is a perspective view thereof;

Figure 3 is an enlarged plan view of the receiving and storage conveyors of the machine of Figure 1;

Figure 4 is a sectional view on the line 4—4 of Figure 3;

Figure 5 is a side elevational view of the parts shown in Figure 3;

Figure 6 is an enlarged side elevational view of the spacer portion of the routing device of Figure 1 with the timing mechanism cover removed;

Figure 7 is a plan view of the parts shown in Figure 6;

Figure 8 is an enlarged fragmentary sectional view on the line 8—8 of Figure 6;

Figure 10 is an end view on a reduced scale thereof;

Figure 11 is a sectional view on a reduced scale on the line 11—11 of Figure 9;

Figure 12 is an enlarged plan view of the selector section of the routing device of Figure 1;

Figure 13 is a side elevational view thereof;

Figure 14 is a sectional view on the line 14—14 of Figure 12;

Figure 15 is an enlarged side elevational view of one of the brushes of Figure 9;

Figure 17 is a side elevational view of a modified form of the routing device of the invention;

Figure 18 is a plan view of the selector section of the routing device of Figure 17; and Figure 19 is a side elevational view similar to Figure 6 of a modified form of elevating and timing mechanism, the carriages and supporting mechanism being omitted.

Figure 9:
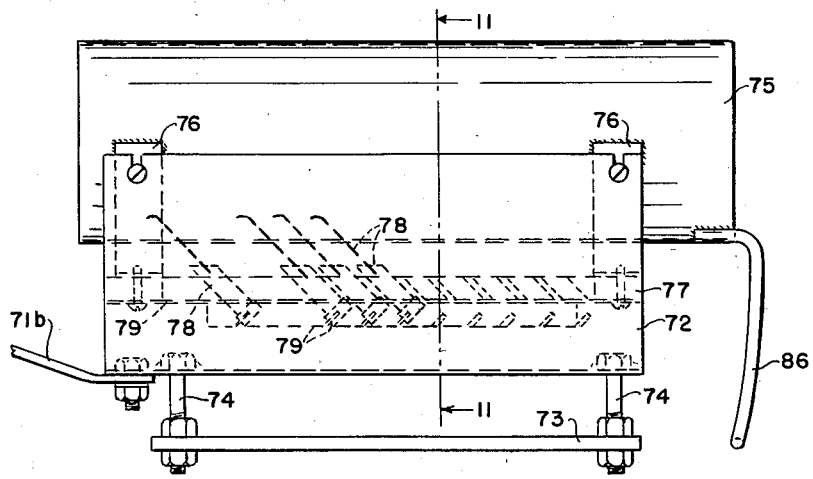
Figure 9 is an enlarged side elevational view of one of the spacer carriages of Figure 6.

In the drawings, first referring more particularly to Figures 1 and 2, the routing device or "line monitor" 20 of the present invention comprises the terminal and slide supporting structure 21, the receiving and storage slide 22, the spacer section 23, the selector slide 24, and the selector supporting structure 25.

The four entering pneumatic conveyor lines 26 from the dispatch stations of the system, only one being shown, are each provided with a conventional discharge terminal 27 and connection 28 to a source of vacuum. The exit lines to the terminal stations of the system are also four in number and are indicated at 29, only one being shown. Each exit line 29 is provided with a conventional bell mouth portion 30 for receiving, in the usual manner, the carriers used in the system, one of which is shown at 31 in Figure 2.

The receiving and storage slide 22 and the spacer section 23 are supported on the supporting structures 21 and 25 to slant downward at substantially a 25-degree angle and the selector slide 24 is supported at a still steeper slant as plainly shown in Figures 1 and 2.

*The receiving and storage slide*

The storage slide 22 is shown in detail in Figures 3, 4 and 5 and comprises a storage frame 31, made of angles and plates bolted and welded together in conventional manner, to which the other parts of the slide are secured. The frame 31 is provided at its upper end with a cross angle 32 which is secured to the conventionally constructed terminal and slide-supporting structure 21. Adjacent its lower end, the frame 31 is provided with another cross angle 33 to which the spacer section 23 is secured.

Upon the frame 31, the floor plates of the slide are secured, the floor of the slide being broken up, for reasons which will be apparent, into separate sections. Floor plates 34 and 35 are secured to the upper and lower ends of the storage frame 31 and floor plates 36 and 37 are secured to the side members of the storage frame. The L-shaped side members 38 and 39 are likewise secured to the side members of the storage frame 31.

Wooden separators 40 are secured to the floor plates 34 and 35 dividing the storage slide 22 into four receiving and storage conveyors 41. The strap 42 extends across the storage slide 22 and is secured to the storage frame 31 and to each separator 40. Floor plates 43, in turn, are secured to the lower surface of each of the separators 40, the floor plates 34, 35, 36, 37 and 43 all being in the same plane.

Pendant bearing support plates 44 are secured to the storage frame 31 and the pulley shafts 45 and 46, journaled in suitable bearings secured to the plates 44, extend across under either end of the storage frame. Pulleys 47 are secured to the shafts 45 and 46 under the center of each receiving and storage conveyor 41 and V belts 48 connect each pair of pulleys between the respective floor plates 36, 43 and 37. The floor plates 34 and 35 are cut away as shown to accommodate the ends of the upper runs of the belts 48. The top of pulleys 47 are level with the floor plates of the conveyors 41 so that the top run of the belts 48, running free, are only slightly above the floor of the conveyors, but any substantial load on the belts is supported by the floor plates with little pressure on the belts 48.

The floor plates 34, 35, 36, 37 and 43 thus constitute the floor of the slide 22 which is broken up by the separators 40 into four separate gravity conveyors 41. Each conveyor has a belt 48, the top run of which is substantially level with the floor of the conveyor, running in a narrow longitudinal slot 49 in the floor of the conveyor, said slot extending for substantially the entire length of the conveyor 41.

The lower end of each conveyor 41 is provided with a cover 50 which is hingedly joined at its upper end to the hinge strap 51 which extends across storage slide 22 and is secured to the sides 38 and 39 and the separators 40. The other end of each cover 50 is provided with a weight 52 for a purpose which will become apparent.

Pendant motor support members 53 are secured to the side members of frame 31, and a channel 54, secured thereto and extending across below slide 22, bears a motor 55 and its connected gear reducer 56 secured thereon. An electrical terminal box 57 provides means for connecting motor 55 to a source of electrical power. Power for driving the belts 48 is supplied by a belt 58 connecting the drive pulley or reducer 56 with a driven pulley 59 secured to shaft 46. The usual belt guard 60 is secured to frame 31.

Guides 61 and 62 may be secured to side members 38 and 39, and to the separators 40 for reasons which will become apparent. For a different purpose, which will also become apparent, the floor plate 35 which extends into the spacer section 23 is cut away at 63—63 in each conveyor 41.

*The spacer section*

Referring now more particularly to Figures 6, 7 and 8, the spacer section 23 comprises a spacer frame 65 of conventional steel angle construction, elevating and timing mechanism suspended below this frame and carriages 66 working within and above said frame 65, all as about to be described.

The spacer frame 65 is provided at its upper end with a cross member 67 which is bolted or otherwise secured to the cross angle 33 of the storage slide frame. At the lower end, each side member of the spacer frame 65 is provided with a gusset plate 68 welded or otherwise secured thereto, and cross member angles 69 and 70 are welded to the plates 68 across the carriage frame as shown for purposes which will become apparent. Gusset plates 68 are adapted to be bolted to the selector supporting structure 25.

The carriages 66 are secured to the cross member 69 by means of the hinge members 71a and 71b (Figure 6) hingedly connected at 71. The shorter member 71a is bolted to cross member 69 and the longer member 71b is bolted to the channel member 72 of the carriage 66 (Figures 9, 10 and 11). Below the channel member 72 of each carriage is secured a comparatively narrow cam plate 73 by means of the studs 74 welded to the channel 72 and appropriate nuts as shown.

To the upper edges of each channel member 72 is secured the carriage tube 75 by means of the U-shaped brush support clips 76 welded to the tube and by appropriate screws as shown. Substantially midway between the tube 75 and the bottom of the channel 71, a brush holder 77 is secured by means of screws to the bottoms of the clips 76.

Sensing brushes 78, here shown as four in number, are carried at an angle in appropriate holes or slots through the brush holder 77 and are held in place by a plastic brush retaining clip 79 as shown in Figures 9 and 10. Brushes 78 are of conventional design and are shown in Figure 15 as comprising a body 80 having a slot 81 adapted to be engaged by the clip 79 and a spring wire contact portion 82 joined to the body 80 by coil springs 83 and 84. The wire sensing contacts 82 extend upward into the interior of the carriage tube 75 through a slot in the bottom of the tube shown at 85 in Figure 7.

The four carriages 66 are so located as to be equally spaced between the side members of the spacer frame 65. When in lowered position (indicated in dot and dash lines in Figure 6) each carriage 66 is so connected to the spacer frame 65 as to be in continuation of one of the conveyors 41 of the storage slide 22, the tube 75 being aligned with and substantially in prolongation of the conveyor 41 and hence in position to receive a carrier from its conveyor 41.

The cross member 70, as plainly shown in Figure 6, forms a fixed stop in front of each carriage 66 when the carriage is in its normal, lowered position. When the carriage is in its raised position, however, as shown in full lines in Figure 6, the tube 75 is raised above the fixed stop 70 so that any carrier in the carriage tube 75 is released therefrom.

The upper end of each tube 75 carries a pendant escapement, or movable stop 86, in the form of a U-shaped loop of wire welded to the tube 75, as plainly shown in Figures 6, 9 and 10. The two legs of the movable stop 86 pass through the cut-away portions 63 in the edge of the floor plate 35 of the storage slide 22 and similar slots cut in the cross member 67 as best seen in Figure 7. When in its normal or lowered position, the upper end of the tube 75 rests upon the cross member 67 immediately adjacent the floor plate 35.

*The elevating and timing mechanism*

The elevating and timing mechanism is carried by the pendant timer side plates 87 which are secured to angles 88 welded to the side members of the spacer frame 65 and comprises the shaft 90, journaled in bearings secured to the side plates 87, and associated parts. Fixed to the shaft 90 are four cam arms 91, one under each of the carriages 66. Arms 91 project radially from shaft 90 at equiangular intervals about the shaft and bear rollers 92 on stub shafts on the outer ends of the arms. Each roller 92 is positioned to contact the cam plate 73 of the carriage 66 above it, when shaft 90 is rotated, in order to elevate the carriage.

Shaft 90 is rotated by a sprocket 93, fixed to one end of the shaft and connected by a chain 94 (Figure 6) to a drive sprocket 95 (Figures 3 and 4) on the shaft 46 of the storage slide 22. Alternatively, of course, sprocket 93 may be rotated by means of another motor.

Timing mechanism is provided in order that the sensing means on each carriage 66, provided by the brushes 78, may be electrically connected to the routing mechanism hereinafter described for only a brief interval from the time the movable stop 86 is first raised until carriage tube 75 is raised above the fixed stop 70. To this end, sprocket 93 is employed as a timer disk and has four disconnect studs 95 mounted thereon and threaded thereto, radially equidistant from shaft 90, equiangularly disposed about the shaft and projecting toward the side plate 87 as shown in Figures 6 and 8.

A fifth and somewhat shorter timer stud 96 is similarly secured to the sprocket 93 at a substantially greater radial distance from shaft 90 and in line with the center line of one of the arms 91 as shown in Figure 6.

Four normally open limit switches S1, S2, S3 and S4 are secured to sideplate 87 and spaced therefrom so that their respective operating arms are contacted successively by the timer stud 96 for conditioning successive carriages for sensing as they are raised. The switches are equiangularly disposed about shaft 90 and at a radial distance therefrom such that their operating arms are not contacted by the disconnect studs 95 when sprocket 93 is rotated.

A fifth limit switch S5, the disconnect switch, normally closed, is also secured to the sideplate 87 for breaking the circuit to the deflector operating mechanism when sufficient time has elapsed for the carrier to have been routed by the deflectors. Switch S5 is spaced at a lesser distance from the sideplate so as to be adapted to be contacted by the four disconnect studs 95 but not by the shorter timer stud 96 when sprocket 93 is rotated.

Sensing of the carriers for routing through the pneumatic system will be discussed more fully in connection with Figure 16, after the following brief description of the selector and routing deflector mechanism.

The selector slide

The selector slide 24, shown in Figures 12, 13 and 14, comprises a selector frame 100 of angles and plates welded or bolted together in conventional manner to which the other parts of the selector slide are secured. The floor plate 101 of the slide 24 is of sheet metal bent upward as shown to form the sides 102 and comprises an upper portion 101a sloped downward at a steeper angle than the storage slide 22 and a lower portion 101b with a more gradual slope whose lower end is supported on a cross member 103 as clearly shown in Figures 2 and 13. A conventional strap 104, for securing the exit lines 29 is also secured to the cross member 103.

The upper end of the selector frame 100 is bolted or otherwise secured to the gusset plates 68 of the spacer frame and the upper end of floor plate 101a is bent down and over the fixed stop 70 as shown in Figures 6 and 13. The lower end of the selector slide portion 101a and the portion 101b is divided into four separate slides or exit conveyors 105 by the two wooden dividers 106 and the central metal divider 107 secured to the floor plate 101 as plainly shown in Figures 2 and 12. The central divider 107 extends considerably farther up the selector slide 24 than the other dividers 106.

Adjacent the upper end of the divider 107, a central deflector 108 is secured to a vertical pivot shaft 109 so that the upper end of the deflector is movable from a rubber bumper 110L to a similar bumper 110R set in the stop openings in the sides 102 of the floor plate 101 near the carriages 66. Similar, but shorter, deflectors 111 are secured to pivot shafts 112 adjacent the upper ends of shorter dividers 106. The shorter deflectors 111 are movable from positions in which their upper end rests against a rubber bumper 113 secured to the upper end of divider 107 to similar bumpers 114 set in openings in the sides 102 opposite the bumper 113. Stop straps 115 are welded to the sides 102 to hold the bumpers 110 and 114 in place.

The deflector operating mechanism is located below the floor plate 101a and is supported by a deflector support frame 116 made up of angles bolted and welded together in conventional manner and secured to the selector frame 100. The deflector shafts 109 and 112 are journaled in pillow blocks 117 bolted to cross members of the selector frame 100 and deflector support frame 116 as best seen in Figure 14, and are secured in place by the collars 118 secured to the shafts by appropriate pins.

The shafts 109 and 112 each have a bellcrank arm 120 secured thereto below floor plate 101a by an appropriate pin and clamping screw, as best seen in Figure 12. Each crank arm 120 bears a stud having an appropriate ball and socket pivoted connection with a connecting rod 121 or 122, the connecting rod 122 for operating the shaft 109 being shorter than the rods 121 for operating the shafts 112. The connecting rods 121 and 122 each have similar ball and socket pivoted connections with a stud secured to the operating arm 123 of a respective one of the rotary solenoids, Sol 1, Sol 2 and Sol 3, which are secured by means of bolts to the cross member 124 of the deflector support frame 116.

Tension springs 125 are secured at one end to a pivoted eye bolt stud on the operating arm 123 of each of the three solenoids. The other end of each of the springs 125 is secured to a cross member 126 of the deflector support frame 116. The deflectors 108 and 111 are thus maintained normally in the positions shown in Figures 2 and 12 by the springs 125 to route a carrier 31 to the right hand slide 105. Routing of a carrier to another of the slides 105 is accomplished by energizing one of a pair of the three solenoids by routing means about to be described.

The sensing and routing mechanism

Secured to one side of the deflector support frame 116 is a relay and rectifier panel 130 (Figures 12 and 13) preferably of electrically non-conductive material to which are secured the relays, R1, R2, R3, R4, R5, R6 and R7 and the rectifiers, Rect 1, Rect 2 and Rect 3. Over these relays and rectifiers and the necessary connective wiring is secured the usual protective cover 131.

Figure 16:
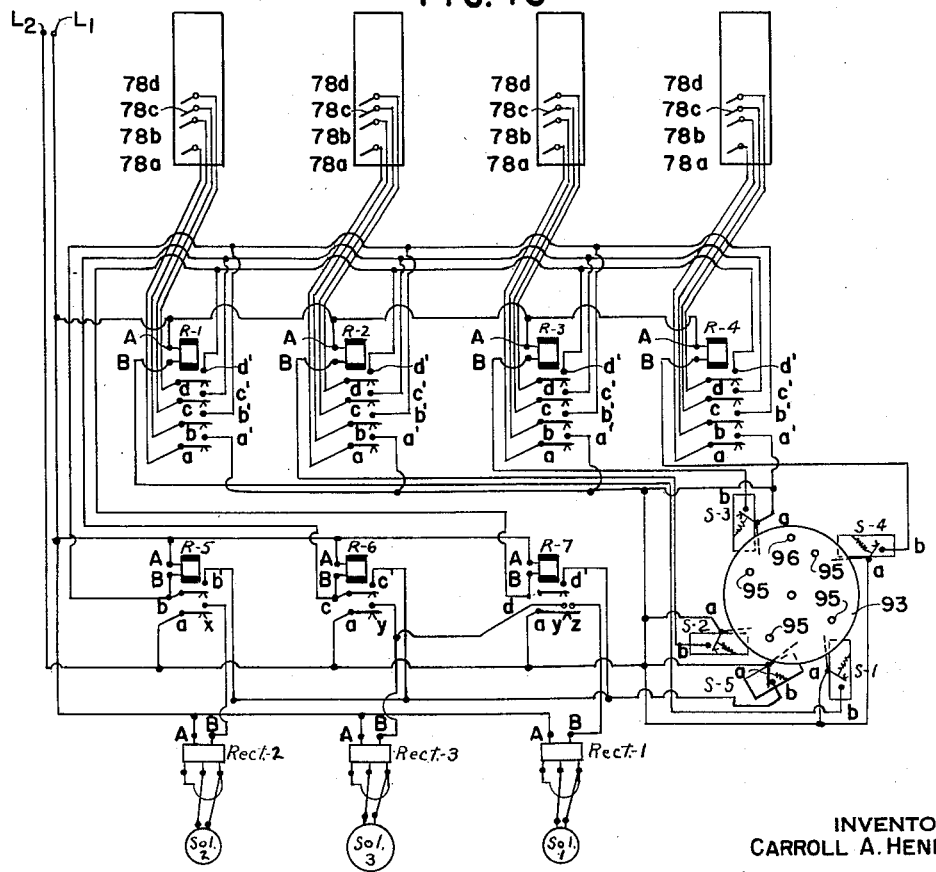
Figure 16 is a wiring diagram of the circuits of the routing device of Figure 1.

Referring now more particularly to Figure 16, it will be seen that the spaced brushes 78 of each carriage 66 are each connected to the armatures a, b, c and d of each of the control relays R1, R2, R3 and R4, respectively, the brushes 78a being connected to the armatures a and the brushes 78b to armatures b, etc. This may conveniently be done utilizing a flexible cable, not shown, secured to the hinge member 71b of each carriage.

The control terminal A of each of the relays R1, R2, R3, R4, R5, R6 and R7 is permanently connected to the terminal L1 of the electrical supply line. The control terminal B of each of the control relays R1, R2, R3 and R4 is connected to the contact b of the normally open timer switches S1, S2, S3 and S4, respectively, and the blade a of each of these switches is connected to the terminal L2 of the electrical supply line. One of the relays R1, R2, R3 or R4, therefore, is energized when the pin 96 on sprocket 93 closes the corresponding switch S1, S2, S3 or S4.

The timer pin 96 is so located on the sprocket 93 with respect to the arms 91 and the timer switches S1, S2, S3 and S4 are so disposed about the shaft 90 that when the first carriage is raised relay R1 is energized, when the second carriage is raised relay R2 is energized, when the third carriage is raised relay R3 is energized and when the fourth carriage is raised relay R4 is energized.

The control terminal B of the operating relay R5 is connected to each of the contacts b' of the relays R1, R2, R3 and R4. The terminal B of the operating relay R6 is connected to each of the contacts c' of the said aforementioned four relays and the terminal B of the operating relay R7 is connected to each of the contacts d' of the same four relays. The contacts a' of each of the control relays R1, R2, R3 and R4 are permanently connected to the terminal L2.

It will be apparent that, if there is a carrier in the carriage being elevated, the brush 78a of said carriage may be connected to either brush 78b, 78c or 78d according to the setting of the routing switch on the carrier. When said brush 78a is connected, through the carrier, to one of the other brushes, relay R5, R6 or R7 will be energized since the control relay corresponding to the carriage being raised is energized and its armatures a, b, c and d are, therefore, connected by operation of the relay to its contacts a', b', c' and d', respectively.

The terminals A of the rectifiers 1, 2, and 3 are connected permanently to the terminal L1. The terminal B of Rect 2 is connected to the contact x of R5, the terminal B of Rect 1 is connected to the contact z of R7 and the terminal B of Rect 3 is connected to the contacts y of R6 and R7. The solenoids, Sol 1, Sol 2 and Sol 3 are connected respectively to the rectifiers Rect 1, Rect 2 and Rect 3, so that the solenoid Sol 2 is operated when the relay R5 is energized, the solenoids Sol 1 and Sol 3 are operated when the relay R7 is energized and solenoid Sol 3 is operated when the relay R6 is energized.

It will be noted that the blade $a$ of the normally closed disconnect switch S5 is permanently connected to the terminal L2. The contact $b$ of the switch S5 is connected to the contacts $b'$, $c'$ and $d'$, respectively, of the operating relays R5, R6 and R7 and the armatures $b$, $c$ and $d$ of these same relays are connected to the control terminal B of its respective relay. When either relay R5, R6 or R7 becomes energized, therefore, a holding current is set up to keep the relay energized until the disconnect switch S5 has been operated by one of the disconnect pins 95 to break the holding circuit.

Operation

The operation of the routing device and its spacing mechanism will now be apparent. A carrier 31 arriving from one of the entering pneumatic lines 26 is delivered through its discharge terminal 27 to one of the receiving and storage conveyors 43. The storage slide, being on an angle of substantially 25 degrees, allows the carrier to proceed down the conveyor 43, its speed determined by the speed of belt 48, and to enter its corresponding carriage 66 where it is halted by the fixed stop 70. If the carriage 66 has been raised, of course, the carrier is halted by the movable stop 86. Should there be a carrier already in the carriage 66, the carrier 31 is halted by the preceding carrier and, it will be noted, there is sufficient room in each conveyor 43 for a plurality of carriers awaiting the action of the spacer mechanism 23.

While the slope of the storage slide 22 is sufficient to enable the conveyors 43 to act as gravity conveyors, it is preferred to provide the belts 48 to deliver the carriers to the carriages 66 at a constant and predetermined rate of speed since the speed of the carriers on a gravity conveyor varies greatly from time to time due to atmospheric conditions, wear on the carrier and other factors. The belt 48 is only slightly above the level of the floor of the conveyor 43, due to the natural stiffness of the belt passing around pulleys 47, so that if several carriers are in storage on the conveyor, most of their weight rests on the floor of the conveyor and there is little friction or wear on the belt and carrier. The friction between carrier and belt, however, is normally sufficient to deliver the carrier to the carriage 66 at a constant speed, which, of course, is the speed of travel of the belt.

The length of the carriage 66 is substantially that of the carriers so that ordinarily if a carrier 31 arrives just as the movable stop 86 is being elevated and there is a carrier already in the carriage, the arriving carrier is halted by the preceding carrier and is held back by the rising stop 86. When a carrier 31 arrives at an empty carriage 66 just as the stop 86 is rising, it will ordinarily proceed into the carriage 66 for sensing in the usual manner or will meet the rising stop 86 and be halted. Should the carrier 31 be halted part way on the carriage, due to wear on the carrier or for any other cause, the front end of the carrier will be elevated along with the carriage and the weighted cover 50 over the conveyor 43 will rise with the carrier and hold it in place until carriage 66 is again lowered. The carrier may then enter the carriage and be sensed on the next elevation of the carriage.

The spacing of the carriers, of course, is obtained by the periodic elevation of separate carriages 66 due to the arms 91 of the elevating mechanism acting on the cam plates 73 of the carriages sequentially. The hinged action of the carriages about the hinges 71 is an especially effective method of elevating the carriages since the carriage is tilted forward as it is elevated which results in the carrier leaving the carriage rapidly and without possibility of sticking. Furthermore, the hinged action of the carriages raises the movable stop 86 into effective position prior to the carrier being raised above the fixed stop 70 for release from the carriage.

It will be apparent from inspection of Figure 6 that the timer pin 96 will strike the operating arm of any one of the switches S1, S2, S3 or S4 after its respective carriage 66 has been elevated so that its movable stop 86 has risen a distance above the floor of the storage conveyors 43 a distance substantially equal to the distance the fixed stop 70 is normally above the floor of the carriages 66 when the carriage is in its lowered position. For example, the right hand arm 91 in Figure 6, indicated 91(3) will have raised the third carriage 66 so that its movable stop 86 is in operative position when the timer pin 96 strikes the operating arm of timer switch S3.

Referring now to Figure 16, it will be apparent that timer switch S3 will be closed until the timer pin 96 has passed the operating arm. Control relay R3 will be energized by reason of the circuit through the now closed switch S3. Assuming that the carrier being elevated in carriage 66 has its routing switch set so that brushes 78$a$ and 78$d$ are connected, the operating relay R7 will be energized by reason of the circuit through contact $d'$ and the now closed armature $d$ of R3, 78$d$ through the carrier to 78$a$, and armature $a$, now closed and in contact with contact $a'$ of R3.

Relay R7 being energized, circuits are set up to energize both solenoids Sol 1 and Sol 3: armature $a$ of R7 and its contact $z$ through Rect 1 to Sol 1; and armature $a$ of R7 and its contact $y$ through Rect 3 to Sol 3.

A holding circuit is also set up upon the energizing of R7 to insure that the solenoids remain energized until after carrier 31 has left carriage 66 and passed the deflectors 108 and 111. Armature $d$ of R7 being in contact with the contact $d'$ upon R7 being energized, a circuit is established through S5 to contact $d'$ of R7 and its now closed armature $d$ which is connected to the control terminal B of R7. This circuit is broken when the disconnect pin 95 opposite the arm 91(3) operates the switch S5.

Referring now to Figure 12, it will be apparent that, when the solenoid Sol 3 is energized, its operating arm 123 will be rotated in a clockwise direction and the rod 122 will be moved endwise upward. The crank arm 120 on shaft 109, together with the shaft, will be rotated clockwise until the upper end of deflector 108, borne on shaft 109, strikes the bumper 110R. The carrier 31, upon being released from the carriage 66, slides swiftly down the selector slide 101$a$, strikes the deflector 108 and is diverted to the left half of the slide.

When solenoid 2 is energized, its operating arm 123 is rotated clockwise, rod 121 is moved endwise and crank arm 120 on the shaft 112 is rotated clockwise moving the left hand deflector 111 from its position against bumper 114 to a position against bumper 113 and deflecting the carrier 31 into the left hand slide 105. The carrier 31 continues down slide 105 into the bell mouth 30 and into the exit line 29 to its desired destination.

It will be apparent from inspection of Figure 6 that switch S5 will not be acted upon by the disconnect pin 95 opposite the arm 91(3), to break the holding circuit until the carrier released from the third carriage has had sufficient time to pass the deflectors 108 and 111.

In a similar manner if it is desired that the carrier be routed to the second exit line, the routing switch on the carrier is set to connect the brushes 78$a$ and 78$c$ of whichever carriage 66 it may enter. The operating relay R6 in this case is energized and the solenoid Sol 3 is alone operated. Deflector 108 is again swung to the right and, since deflector 111 remains in its normal or rest position under the action of spring 125, the carrier 31 passes to the second exit line.

In a similar manner, when it is desired to route the carrier to the third exit line, solenoid Sol 1 is alone energized and deflector 108 remains in its rest position as shown in Figure 2.

To route the carrier 31 to the right hand exit line, the switch on the carrier is set at zero so that the brush 78a is never connected to any of the brushes 78b, 78c or 78d upon sensing, and deflectors 108 and 111 all remain in their rest or normal position as shown in Figures 2 and 12. For this reason it is sometimes desirable to connect the right hand slide 105 to no exit line 29 but allow it to discharge into a short storage slide into which defective carriers or carriers on which the routing switch is imperfectly set may be rerouted by hand by placing them in the desired slide 105. Alternatively, such carriers with defective switch settings will go to the one discharge station connected to the right hand slide 105.

*The belt-type selector*

A modification of the routing device described above is shown in Figures 17 and 18 in which the storage slide 22 and carriage section 23 are exactly the same as in the device 20 but the selector section is a belt conveyor instead of a gravity slide. In the device 150, there shown, the terminal and storage slide supporting structure 151 is considerably shorter than the structure 21 of the device 20 and the device 150 may be used where there is less headroom or vertical space available.

The selector conveyor 154 of the routing device 150 comprises a conventional belt conveyor 155 to which deflector mechanism similar to that of the selector slide 24, already described, has been added.

The conveyor 155 is of conventional construction having side members 156 with appropriate cross members, legs 157 and 158, the leg member 157 serving as a base for the motor 159, conveyor drive roll 160 and driven roll 161, a take up roll 162 and the endless conveyor belt 163. Suitable chain and sprocket means are provided for driving the roll 160 by means of the motor 159. The belt 163, of course, is continuously driven as long as the routing device 150 is in operation.

The exit lines 29 of routing device 150 are secured to the end of conveyor 155 by means of the clamp 104 secured to a suitable cross member and are provided with the usual bell mouths 30.

The gusset plates 68 of the carriage section 23 are secured to the side members 156 of the conveyor 155. A short gravity slide 165, broken up into four chutes each one in continuation of one of the carriages, is secured on the cross members 69 and 70 so as to guide carriers from the carriages 66 on to the belt 163.

A deflector support frame 166, conventionally constructed of angles and plates bolted or welded together, is supported on and secured to the side members 156. The deflector mechanism and deflector operating mechanism, supported in the frame 166 is the same for the conveyor 154 as for the selector slide 24 except that, being above the conveyor 155, the parts are inverted.

The deflectors 108 and 111 are secured to their respective shafts 109 and 112 and suspended immediately above the upper run of the belt 163, there being sufficient room for the carriers 31 between the belt and the supporting frame 166. Shafts 109 and 112 are journaled in suitable pillow blocks 117 secured to the frame 166 and are held in place by collars 118.

The solenoids Sol 1, Sol 2 and Sol 3 are secured to a cross member 124 and their operating arms 123 are connected to crank arms 120 on the shafts 109 and 112 by rods 121 and 122, there being suitable ball-and-socket connections at either ends of the rods. The springs 125 are secured at one end to a cross member 126 and, at the other to the operating arms 123 of the solenoids to maintain the deflectors 108 and 111 in their normal positions as shown in Figure 18.

Rubber bumpers 110L, 110R and 114 are set in the side members 156 for the deflectors 108 and 111 respectively and are held in place by the stops 115. Dividers 106 and 107 are secured at one end to a suitable cross member 167 and at the other end to a cross member of the deflector support frame 166. Divider 107 is provided with the rubber bumper 113 for the deflectors 111 adjacent the shaft 109. The dividers 106 and 107 separate the end of the selector conveyor 154, in effect, into four exit conveyors 170 leading to the four exit lines 29.

A relay and rectifier panel 130 is secured to one side of the deflector supporting frame 166 and the seven relays R1 to R7 are secured thereto as well as the rectifiers Rect 1, Rect 2 and Rect 3. A cover 131 is provided for their protection.

The operation of the selector conveyor 154 is the same as for the selector slide 24. The carriers 31 are sensed in the carriages 66 and released in turn on to the belt 163 which carries the carriers to the exit lines 29. The sensing brushes 78 of the carriages energize the proper relays to operate the solenoids 1, 2 and 3 as described above. When deflector 108 is swung to the right from the normal position shown in Figure 18, the carrier is deflected to the left half of the conveyor. When the deflector 108 is in its normal position, the carrier 31 is deflected to the right half. Deflectors 111 are operated in a similar manner by the solenoids Sol 1 and Sol 2 to route the carrier 31 to the selected conveyor 170 and thence to the desired exit line 29.

*Modification of the elevating and timing mechanism*

A modified form of elevating and timing mechanism suitable for a pneumatic conveyor system in which one of the entering lines habitually carries a larger share of traffic than the others is schematically shown in Figure 19.

To the cam shaft 90 of the routing device 20 are secured five cam arms 191. Arms 191(1), 191(3) and 191(4) are disposed along shaft 90 under the first, third and fourth carriages respectively and arms 191(2) and 191(2') are both secured to the shaft under the second carriage. The arms 191 project radially from the shaft 90 at equiangular intervals about the shaft and bear rollers 192 on the outer ends of the arms rotatably secured thereto by suitable stub shafts. Each of the rollers 192 is positioned to contact the cam plate 73 of the carriage above it, the arms 191(2) and 191(2') being oppositely faced on the shaft so as to both be adapted to raise the second carriage 66.

A chain driven sprocket 193, somewhat larger than sprocket 93, is secured to shaft 90 and it bears a timer pin 196 and five disconnect pins 195 disposed thereon in the same manner as the similar pins of the sprocket 93, the angular spacing between the pins 195 about shaft 90, of course, being 72 degrees. There are also six limit switches disposed about shaft 90 and secured to the sideplate 87 of the timer supporting structure, the switch S5 being the disconnect switch. The five timer switches are equiangularly disposed about shaft 90 and are connected in the electrical circuits of the routing device as shown in Figure 16 except that the switch S2' is wired in parallel with the switch S2 as shown in that figure.

The operation of the above described elevating and timing mechanism will be now apparent. For each revolution of the shaft 90, the pin 196 will operate the timer switches in turn and the sensing brushes of each carriage 66 will be conditioned for sensing, as the carriage is sequentially raised by the appropriate arm 191. The second carriage, however, will be raised twice upon each revolution of the shaft 90, once by the arm 191(2) and once by the arm 191(2'). Twice as many carriers may therefore be handled by the second line as by each of the other entering lines.

Further possible modifications of the elevating and timing mechanism will be apparent to those skilled in the art. Electrically operated elevating means, such as solenoids, may be substituted for the cam arms and cam shaft 90, and stepping switches and feeler switches may be used instead of the timing means hereinabove described.

It will also be apparent that by the substitution of such electrically operated elevating means together with appropriate known signal means, the separate elevation of the appropriate carriage on demand from the most heavily loaded storage conveyor will be possible, independent of any cyclic or sequential movement of the carriages.

While there is herein described, and in the drawings shown, illustrative embodiments of the invention, it is to be understood that the invention is not limited thereto, but may comprehend other constructions, arrangements of parts, details and features without departing from the spirit of the invention. I desire to be limited, therefore, only by the scope of the appended claims.

I claim:

1. In a pneumatic conveyor system having a plurality of pneumatic conveyor lines entering and a plurality of lines leaving a carrier routing device of the type having a frame and a carriage movably mounted on said frame for each entering line normally adapted to receive carriers from said line, the combination of stop means carried by said frame adjacent the delivery end of each of said carriages, spacing means for separately elevating and lowering each carriage, whereby carriers in said carriages are raised over said stop means and thereby released from said carriages, stop means adjacent the receiving end of each carriage for preventing the entry of a carrier when said carriage is elevated, a common selector conveyor onto which said carriers are successively delivered from said carriages, and means operating under control of the carriers during their elevation in said carriages for selectively directing said carriers from said selector conveyor into said lines leaving said device as determined by said carriers.

2. In a pneumatic conveyor system having a plurality of pneumatic conveyor lines entering and a plurality of lines leaving a carrier routing device of the type having a frame, a receiving and storage conveyor for each entering line, and a carriage movably mounted on said frame and normally connected in continuation of each storage conveyor and adapted to receive a carrier delivered by said storage conveyor, the combination of stop means carried by said frame adjacent the delivery end of each of said carriages, carrier sensing means carried by each of said carriages, spacing means for separately elevating and lowering each carriage, whereby carriers in said carriages are raised over said stop means and thereby released from said carriages, stop means adjacent the receiving end of each carriage for preventing the exit of a carrier from the connected storage conveyor when said carriage is elevated, a selector conveyor onto which said carriers are successively delivered from said carriages, exit conveyors leading from said selector conveyor to each of the lines leaving said device, and deflector means responsive to said sensing means for routing said carriers to a pre-selected one of said exit conveyors.

3. In a pneumatic conveyor system having a plurality of dispatch lines, a plurality of terminal lines, and routing means for selectively directing a carrier from any one of the dispatch lines into any one of the terminal lines under control of the carriers during their passage through a carrier routing device having a frame, a receiving and storage conveyor for each of said dispatch lines, and a carriage hingedly mounted on said frame and normally connected in continuation of each storage conveyor and adapted to receive a carrier delivered by said storage conveyor, the combination of stop means carried by said frame adjacent the delivery end of each of said carriages, stop means carried by each carriage adjacent the receiving end thereof, and elevating means for separately raising and lowering each said carriage, whereby carriers in said carriages are raised over said first mentioned stop means and thereby released from said carriages and carriers in said storage conveyors are prevented by said second mentioned stop means from leaving said storage conveyors when the connected carriage is raised.

4. In a pneumatic conveyor system having a plurality of dispatch lines, a plurality of terminal lines and routing means for selectively directing a carrier from any one of the dispatch lines into any one of the terminal lines under control of the carriers during their passage through a carrier routing device having a frame, a receiving and storage conveyor for each of said dispatch lines, and a carriage hingedly mounted on said frame and normally connected in continuation of each storage conveyor and adapted to receive a carrier delivered by said storage conveyor, the combination of stop means carried by said frame adjacent the delivery end of each of said carriages, carrier sensing means on each carriage, a common selector conveyor adapted to receive carriers from said carriages and direct said carriers into said terminal lines as determined by the cooperation of said carriers and said sensing means, a continuously rotating shaft under said carriages having radially projecting arms under said carriages adapted to periodically elevate said carriages for sequentially lifting said carriages above said stop means and thereby releasing carriers from said carriages onto said common selector conveyor, timing mechanism associated with said rotating shaft for conditioning said carrier sensing means for determining the direction of said carriers in said common selector conveyor, and stop means carried by each carriage adjacent the receiving end thereof for preventing the exit of a carrier from the connected storage conveyor when said carriage is elevated.

5. In a pneumatic conveyor system having a plurality of pneumatic conveyor lines entering and a plurality of lines leaving a carrier routing device of the type having a frame, a receiving and storage gravity conveyor for each entering line, and a carriage movably mounted on said frame and normally connected in continuation of each storage conveyor and adapted to receive a carrier delivered by said storage conveyor, the combination of stop means carried by said frame adjacent the delivery end of each of said carriages, spacing means for separately elevating and lowering each carriage, whereby carriers in said carriages are raised over said stop means and thereby released from said carriages, stop means carried by each carriage adjacent the receiving end thereof for preventing the exit of a carrier from the connected storage conveyor when said carriage is elevated, each of said receiving and storage gravity conveyors having a comparatively narrow slot through the floor thereof, said slot extending substantially the entire length of said conveyor, a constantly driven endless belt in each said slot, the top run of said belt being substantially at the level of said floor, whereby carriers are delivered to said carriages at a constant rate of speed, a common selector conveyor onto which said carriers are successively delivered from said carriages, and means operating under control of the carriers during their elevation in said carriages for selectively directing said carriers from said selector conveyor into said lines leaving said device as determined by said carrier.

6. In a pneumatic conveyor system having a plurality of pneumatic conveyor lines entering and a plurality of lines leaving a carrier routing device of the type having a receiving and storage gravity conveyor for each entering line and wherein carriers arrive intermittently at the entrance to each conveyor and are intermittently delivered from said conveyor for delivery through said routing device, the combination of a movable stop located at the end of each conveyor, each of said conveyors comprising an inclined gravity operated chute having sides and a smooth floor for guiding said carriers and being of sufficient length for a plurality of said carriers, said floor being of approximately the width of a single carrier and having a comparatively narrow, substantially central slot extending the length of said chute, and an endless belt constantly driven in said slot, the upper run of said belt being in substantially the same plane as said floor, whereby carriers received by said conveyor are delivered for routing through said device at a constant rate of speed and carriers detained by said movable stop are supported by said floor with little friction from said belt.

7. In a pneumatic conveyor system having a plurality of pneumatic conveyor lines entering and a plurality of lines leaving a carrier routing device of the type having a receiving and storage conveyor for each entering line, and a carriage normally connected in continuation of each storage conveyor and adapted to receive a carrier delivered by said storage conveyor, the combination of fixed stop means normally at the delivery end of each of said carriages, carrier sensing means on each of said carriages, each carriage being hingedly secured to said routing device beyond said fixed stop means, a continuously rotating shaft under said carriages having a radially projecting arm under each carriage adapted to elevate said carriages successively in turn for lifting said carriages above said fixed stop means and thereby releasing carriers from said carriages, timing mechanism associated with said rotating shaft for conditioning said carrier sensing means for cooperation with said carrier only while each said carriage is elevated, movable stop means carried by each carriage for preventing the exit of a carrier from the connected storage conveyor associated with said carriage when said carriage is elevated, a common selector conveyor adapted to receive carriers from all of said carriages, and deflector means on said common selector conveyor responsive to the cooperation of said carriers and said sensing means for directing said carriers to one or another of said pneumatic lines leaving said device as determined by said carriers.

8. In a pneumatic conveyor system having a plurality of pneumatic lines entering and a plurality of lines leaving a carrier routing device and adapted for carriers having electrically interconnected spaced signal contacts thereon, said device being of the type having a carriage for each entering line normally adapted to receive carriers from said line, the combination of spaced sensing contacts on each carriage, spacer means including a cam shaft for sequentially releasing carriers from each carriage, a timer disk secured to said shaft, a normally open timer switch for each carriage adjacent said disk, a timer pin on said disk for operating said switches in turn, a normally closed disconnect switch adjacent said disk, at least one disconnect pin on said disk for each carriage for successively operating said normally closed disconnect switch, deflector means for routing said carriers from said carriages to said lines leaving said device, actuating means for said deflector means, a control relay for each carriage, operating relays for said deflector actuating means, self-holding circuits in each of said operating relays each including said normally closed disconnect switch, a circuit from each normally open timer switch to a different one of said control relays for conditioning said carriage spaced contacts for sensing, conductors from each of the spaced sensing contacts on each carriage to a different one of the normally open contacts of all of the said control relays, one of said normally open contacts of each control relay being adapted for conditioning said carriage spaced contacts for sensing, and conductors adapted to connect the other normally open contacts of each control relay to different operating relays, whereby said deflector means are operated in response to the spaced signal contacts of a carrier in any carriage when its respective timer switch is operated.

References Cited in the file of this patent

UNITED STATES PATENTS

| | | |
|---|---|---|
| 820,084 | Ballard | May 8, 1906 |
| 1,299,198 | Low et al. | Apr. 1, 1919 |
| 2,052,597 | Beckmann | Sept. 1, 1936 |
| 2,241,917 | Mehlis et al. | May 13, 1941 |
| 2,506,661 | Busse | May 9, 1950 |
| 2,610,725 | Schieser et al. | Sept. 16, 1952 |
| 2,712,910 | Goerlich | July 12, 1955 |

FOREIGN PATENTS

| | | |
|---|---|---|
| 503,729 | Great Britain | Apr. 13, 1939 |